United States Patent

[11] 3,619,319

| [72] | Inventor | Kastulus Utz<br>Freising, Germany |
|---|---|---|
| [21] | Appl. No. | 741,575 |
| [22] | Filed | July 1, 1968 |
| [45] | Patented | Nov. 9, 1971 |
| [73] | Assignee | Alkor-Werk Karl Lissman KG<br>Munich-Solln, Germany |
| [32] | Priority | July 5, 1967 |
| [33] | | Germany |
| [31] | | A 56196 |

[54] METHOD OF MAKING A COMPOSITE REINFORCED SYNTHETIC RESIN SHEET MATERIAL
11 Claims, 2 Drawing Figs.

[52] U.S. Cl. .................................................. 156/229,
156/244, 156/264, 156/296, 156/309
[51] Int. Cl. ................................................. B32b 31/00
[50] Field of Search........................................ 156/148,
180, 229, 244, 306, 296, 309

[56] References Cited
UNITED STATES PATENTS

| 2,482,164 | 9/1949 | Finlayson et al. | 156/148 |
|---|---|---|---|
| 2,525,476 | 10/1950 | Chase et al. | 156/148 |
| 2,770,026 | 11/1956 | Petersilie et al. | 156/148 X |
| 2,812,570 | 11/1957 | Petersilie et al. | 156/148 X |
| 3,336,173 | 8/1967 | Renfroe | 156/148 |
| 3,445,319 | 5/1969 | Dawbarn | 156/244 X |
| 3,474,952 | 10/1969 | Cover et al. | 156/309 X |

*Primary Examiner*—Benjamin R. Padgett
*Assistant Examiner*—Stephen J. Lechert, Jr.
*Attorney*—William Anthony Drucker ABSTRACT: The specification describes a method of making a sheet material in which strips of plastic laminate are woven, knitted or otherwise made into a textile product which is then subjected to fixation, for instance by heat so that the strips are connected together. Owing to the outer layers of the laminated strips having a lower melting point fixation can be carried out without affecting the inner layers of the laminated strips which may have been stretch-orientated and maintain this orientation during the fixation process.

PATENTED NOV 9 1971　　3,619,319
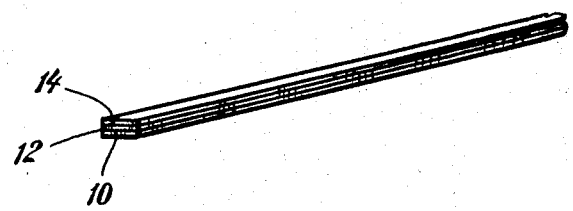
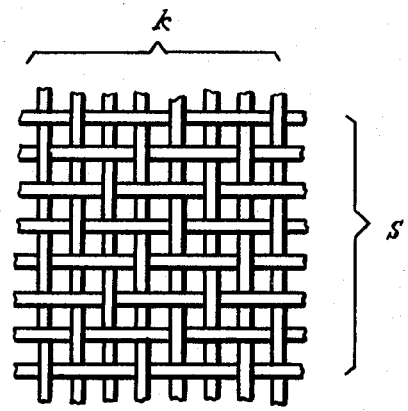

METHOD OF MAKING A COMPOSITE REINFORCED SYNTHETIC RESIN SHEET MATERIAL

The present invention relates to the production of reinforced sheet materials on a synthetic resin basis.

The use of fine strips of material instead of fibers for the production of textile products by established methods in the textile industry is known. Generally the strips are produced by cutting up foils and then stretching. The production of the strips is generally cheaper than the production of fibers. For many purposes textile materials made on the basis of bands are at least as good as textile materials based conventional synthetic fibers.

One object of the present invention is to provide an improved method of producing textile materials using strips.

The invention consists in a method for the production of a textile-reinforced material on a synthetic resin basis, comprising the steps of preparing multilayer strips made up of foil layers of different materials, making the strips into a textile product such as a woven fabric, knitted fabric, or a batt or felt, and then subjecting the textile product to a fixation treatment in which only a part of the layers of the multilayer strips is affected.

The production of multiple layer foils, that is to say foil laminates is known. A number of different procedures can be used for this purpose and it is possible to cut fine strips from known multiple layer foils, just as strips can be cut from single layer foils.

If, as will generally be the case, at least a part of the layers of the strips are made up of thermoplastic material, the fixation treatment can include heat and pressure treatment. Alternatively fixation can be carried out by treatment with a solvent.

If it is desired to preserve a distinct textile character in the finished material to be produced in accordance with the invention, the fixation treatment of the layers can be limited to joining the strips at points of intersection at point junctions. On the other hand if it is desired to produce a foillike waterproof material with a textile foundation, that is to say a textile-based material, the fixation treatment can be continued until the strip layers which are affected by the fixation treatment form a closed surface.

Just as is the case with single layer foil strips, it is possible to stretch multiple layer foil strips if it is desired to improve their mechanical properties by stretching. The different nature of the materials in the individual layers of the strips opens up new possibilities in this respect: it is possible to stretch the multiple layer foil strips at a temperature which is under the crystallite melting point of the layers with the higher melting point but above the crystallite melting point of the layers with the lower melting point. Such a method is known in principle for foils. It results in part of the layers taking on a stretch orientation while there is no such orientation in the remaining layers. If the fixation treatment is then carried out in the temperature range between the crystallite melting points of the individual layers, only those layers are affected which are not stretch-orientated while the other layers with the stretch-orientation retain it.

Of the various possibilities for the production of multiple layer foil strips, at the present time the joining together of the layers in a hot condition after extrusion and cutting up of the multiple layer foils converted into strips, appears to be the most convenient. It is possible to form strips together by means of parallel extrusion nozzles having the form of broad slots or by means of multiple layer blowing nozzles. There is no need to adopt particular measures cause adhesion between the layers in the case of materials which are chemically related. However in the case of joining materials which are chemically different, particular measures have to be taken to bring about adhesion. One particular method of causing adhesion which is useful in the present invention is that of exposing the thermoplastic layers to an oxidizing gas atmosphere, for instance chlorine or ozone, or an atmosphere enriched with oxygen, as described in the German specifications 1,136,818 and 1,203,452.

The invention will now be described with reference to one specific example.

EXAMPLE

A triple layer foil 6, 11 or tube was extruded from a blowing head with three annular nozzles. The middle layer of polyamide consisted of Polyamid 6, 11 and the two other layers were of polyethylene with a density of 0.92 and a melt index of 1.5. The diameter of the middle annular nozzle was 140 mm. while the diameters of the inner and outer annular nozzles were respectively 20 mm. smaller and greater. The width of the annular nozzles was 0.6 mm. The temperature of the materials emerging from the annular nozzles was 240° C. In the annular spaces between the layers an ozone-oxygen atmosphere was maintained containing 3 percent $O_3$. The innermost hose was inflated by means of an internal gas pressure. The largest diameter to which the hose was inflated was 240 mm. The hose was drawn off at a speed of 6 m/min. The hose was cut into strips having a breadth of 6 mm. and a thickness of 0.06 mm. The strips were then stretched at a temperature of 130° C. with a stretch ration of 1:4. The stretched strips had a breadth of 3 mm. and a thickness of 0.03 mm.; the middle layers of the strips were stretch-orientated but not the two outer layers since the stretching temperature had been between the melting point of the crystallites of the polyethylene on the one hand and of the polyamides on the other hand. The thickness of the polyethylene layers in the stretched strips was 0.01 mm. and the layer of polyamide was 0.01 mm. in thickness.

The strips were then made into a woven fabric, the strips being used both for the warp and the weft of the fabric. The weave was plain. The fabric was then calendered at a pressure of 5000 kg. and a calender breadth of 1600 mm., the temperature being 125° C. It is found that the material so produced still had a distinctly textile, porous character. The strips were only connected at the points of intersection owing to fusion between the polyethylene layers. Since the polyamide layers were not affected by the calendering fixation, their mechanical strength produced by the stretching was not impaired.

A further sample of the woven material was calendered at a temperature of 140° C., the pressure being 16000 kg. and the calender breadth 1600 mm. In this case the textile character was substantially lost. The material had assumed a foillike structure and was impermeable to water. The polyamide layers of the strips however still formed a reinforcement in the foil.

The invention will now be further described with reference to the accompanying drawing.

FIG. 1 shows a strip for the production of materials in accordance with the invention.

FIG. 2 shows a material in accordance with the invention produced by weaving multilayer or multiply foil strips so as to form a body.

As can be seen from FIG. 1 there are three layers 10, 12 and 14. The layers 10 and 14 consist of polyethylene while the layer 12 consists of polyamide. In FIG. 2 the weft strips are denoted by $s$ while the warp strips are denoted by $k$. At the points of intersection the strips are connected together by calendering at a raised temperature, only the polyethylene layer strips being fused together.

The materials in accordance with the invention can be sewn and also welded irrespective of whether the strips in them are only connected together at points or whether a foillike structure is produced. For welding the proviso should be observed that the temperature and pressure exerted should not affect the components having the higher melting point. This is so if the welding temperature is above the melting point of the components having the lower melting point but below the melting point of those having the higher one.

A further advantage of materials in accordance with the invention is their resistance to slip.

I claim:

1. A method of making a composite reinforced synthetic resin sheet material, comprising the steps of:
   a. forming elongated strips of synthetic resin thermoplastic material of a first composition;
   b. arranging a plurality of said strips to intersect or touch one another as a first layer in contact with a second layer or elongated reinforcing material of a second composition; and thereafter
   c. bonding together into a sheet by heat and pressure strips of said first composition, and thereby securing said reinforcing material of second composition between bonded strips of said first material 2. A method for making a sheet material from thermoplastic strips comprising:
   a. forming strips consisting of at least two layers of different melting points and having an outer layer of lower melting point;
   b. mechanically arranging a plurality of such strips into a sheet; and
   c. joining together the strips by subjecting the strips to heat and pressure, by which the lower melting outer layers of the strips fuse and the strips are, thereby sealed together.

3. A method in accordance with claim 1 in which the fixation treatment is continued until a foillike closed material is produced.

4. A method in accordance with claim 2 in which multiple layer foil strips are used which are stretch-orientated.

5. A method in accordance with claim 2 in which strips are used which are stretched at a temperature which is below the crystallite melting point of the first strip of material but above the crystallite melting point of the other reinforcing material and the strips are joined together at a temperature which is between the crystallite melting points of the different layers.

6. A method in accordance with claim 1 in which strips are used which internally have a layer of second material having a higher melting point and externally have layers of first material melting at a lower temperature.

7. A method in accordance with claim 2 in which strips are formed by extrusion and cutting up of the laminate so produced.

8. A method in accordance with claim 7 in which strips are used whose layers are joined together by the use of an oxidizing gas on hot extruded material.

9. A method in accordance with claim 8 in which strips are used whose layers are combined in a multiple layer blowing process.

10. A method in accordance with claim 2 in which strips are used which have a middle layer of polyamide and outer layers of polyethylene.

11. A method in accordance with claim 2 in which the strips have as a middle layer a layer of polyester and as outer layers layers of polyethylene.

* * * * *